(12) United States Patent
Wakabayashi et al.

(10) Patent No.: US 9,735,691 B2
(45) Date of Patent: Aug. 15, 2017

(54) POWER SUPPLY DEVICE

(71) Applicant: SHINDENGEN ELECTRIC MANUFACTURING CO., LTD., Tokyo (JP)

(72) Inventors: Koji Wakabayashi, Hanno (JP); Konosuke Nitta, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/027,556

(22) PCT Filed: Nov. 29, 2013

(86) PCT No.: PCT/JP2013/082264
§ 371 (c)(1),
(2) Date: Apr. 6, 2016

(87) PCT Pub. No.: WO2015/079580
PCT Pub. Date: Jun. 4, 2015

(65) Prior Publication Data
US 2016/0241151 A1  Aug. 18, 2016

(51) Int. Cl.
*H02M 3/335* (2006.01)
*H02M 1/088* (2006.01)
*H02M 1/00* (2006.01)

(52) U.S. Cl.
CPC ....... *H02M 3/33546* (2013.01); *H02M 1/088* (2013.01); *H02M 3/33592* (2013.01); *H02M 2001/0009* (2013.01); *Y02B 70/1475* (2013.01)

(58) Field of Classification Search
CPC ............. H02M 3/335; H02M 3/33569; H02M 3/33507; H02M 3/33538; H02M 3/33523;
(Continued)

(56) References Cited

U.S. PATENT DOCUMENTS 5,774,350 A * 6/1998 Notaro .............. H02M 3/33592
363/127
5,841,641 A * 11/1998 Faulk .................... H02M 3/335
363/21.14
(Continued)

FOREIGN PATENT DOCUMENTS

| JP | 2002-153054 | 5/2002 |
| JP | 2007-082354 | 3/2007 |
| JP | 2009-290932 | 12/2009 |
| JP | 2009-290986 | 12/2009 |

OTHER PUBLICATIONS

International Search Report for PCT/JP2013/082264, mailed Mar. 4, 2014, 3 pages.

*Primary Examiner* — Jue Zhang
*Assistant Examiner* — Kevin H Sprenger
(74) *Attorney, Agent, or Firm* — Nixon & Vanderhye P.C.

(57) ABSTRACT

A power supply device includes: a switching element that performs synchronous rectification on a power to be induced in a first secondary wiring of a transformer that performs voltage conversion; a first current detection circuit that detects a value of a current to be induced in a second secondary wiring of the transformer; a second current detection circuit that detects a change in the current to be induced in the second secondary wiring, the second current detection circuit having a higher response speed with respect to conversion of the current than that of the first current detection circuit; and a control unit (control circuit) that determines based on the change in the current detected by the second current detection circuit whether or not backflow is occurring, and controls the switching element in accordance with a result of the determination.

4 Claims, 6 Drawing Sheets

(58) Field of Classification Search
CPC ......... H02M 3/33515; H02M 3/33592; H02M 3/33576; H02M 3/33561; H02M 3/33546; H02M 3/156; H02M 3/3372; H02M 3/3378; H02M 3/337; H02M 3/3376; H02M 3/28; H02M 3/3384; H02M 2001/0032; H02M 2001/0025; H02M 2001/346; H02M 7/53806; H02M 7/48; H02M 7/51; H02M 7/538; H02M 7/5387; H02M 7/003; H02M 7/53871; H02M 7/53875; H02M 7/53803; H02M 7/537; H02M 7/53835; H02M 7/5381; H02M 7/53846; Y02B 70/1433
USPC .............. 363/21.04–21.11, 24–26, 55–56.08, 363/131–134
See application file for complete search history.

(56) References Cited

U.S. PATENT DOCUMENTS

| | | | | |
|---|---|---|---|---|
| 6,426,884 B1* | 7/2002 | Sun | ................... | H02M 3/33592 363/127 |
| 7,012,821 B1* | 3/2006 | Park | ................. | H02M 3/33592 363/21.12 |
| 2002/0057586 A1 | 5/2002 | Takahashi | | |
| 2011/0025289 A1* | 2/2011 | Wang | ................. | H02M 1/4225 323/285 |
| 2011/0194206 A1* | 8/2011 | Sase | ................. | H02M 3/33592 360/75 |
| 2012/0314454 A1* | 12/2012 | Hosotani | ........... | H02M 3/33507 363/21.01 |

\* cited by examiner

POWER SUPPLY DEVICE

This application is the U.S. national phase of International Application No. PCT/JP2013/082264 filed 29 Nov. 2013, which designated the U.S., the entire contents of which is hereby incorporated by reference.

TECHNICAL FIELD

The present invention relates a power supply device.

BACKGROUND ART

Synchronous rectification DC-DC converters are known as power supply devices using synchronous rectification. The synchronous rectification DC-DC converter uses a FET (field effect transistor), and switches between an on-state and an off-state of a gate of the FET at a necessary timing in synchronization with a clock, thus performing operation of the synchronous rectification. Some synchronous rectification DC-DC converters have a backflow prevention circuit for preventing backflow. The backflow prevention circuit detects a voltage of a switching terminal immediately after the FET configured to perform synchronous rectification operation is turned off, thus determining whether backflow is occurring. Additionally, if it is determined that the backflow is occurring, the backflow prevention circuit prevents the FET from entering the on-state, thus preventing backflow (see, for example, Patent Document 1).

Additionally, in a case where a synchronous rectification DC-DC converter is mounted on a vehicle or the like, there are some cases where an external power source, such as a battery, is connected to an output terminal of the synchronous rectification DC-DC converter. Further, there are some synchronous rectification DC-DC converters whose output is connected to a choke coil. Additionally, when a battery is connected to an output terminal, there are some cases where a voltage of the battery becomes higher than an output voltage of the synchronous rectification DC-DC converter.

CITATION LIST

Patent Document

[Patent Document 1] Japanese Patent Application Laid-Open Publication No. 2009-290986

DISCLOSURE OF THE INVENTION

Problems to be Solved by the Invention

However, in the above-described technology, when the voltage of the external power supply, such as a battery, becomes high, there are some cases where backflow occurs on the synchronous rectification DC-DC converter side through choke coil and the FET configured to perform synchronous rectification operation. There have been problems in that there is a possibility that a surge voltage generated by the backflow will cause destruction of other semiconductor elements included in the synchronous rectification DC-DC converter.

The present invention has been made in view of the above problem, and has an object to provide a power supply device that can reduce an impact of backflow on components of the power supply device.

Means for Solving the Problems

To achieve the above object, a power supply device according to one aspect of the present invention includes: a switching element configured to perform synchronous rectification on a power to be induced in a first secondary wiring of a transformer configured to perform voltage conversion; a first current detection circuit configured to detect a value of a current to be induced in a second secondary wiring of the transformer; a second current detection circuit configured to detect a change in the current to be induced in the second secondary wiring, the second current detection circuit having a higher response speed with respect to conversion of the current than that of the first current detection circuit; and a control unit configured to determine based on the change in the current detected by the second current detection circuit whether backflow is occurring, and control the switching element in accordance with a result of the determination. The second current detection circuit is configured to detect a minimum value of values of the current. The control unit is configured to, in a case that the minimum value is detected by the second current detection circuit, determine that backflow is occurring.

Effects of the Invention

According to the present invention, it is possible to reduce an impact of backflow on components of the power supply device.

MODE FOR CARRYING OUT THE INVENTION

Hereinafter, an embodiment of the present invention will be described with reference to the drawings.

Figure 1:
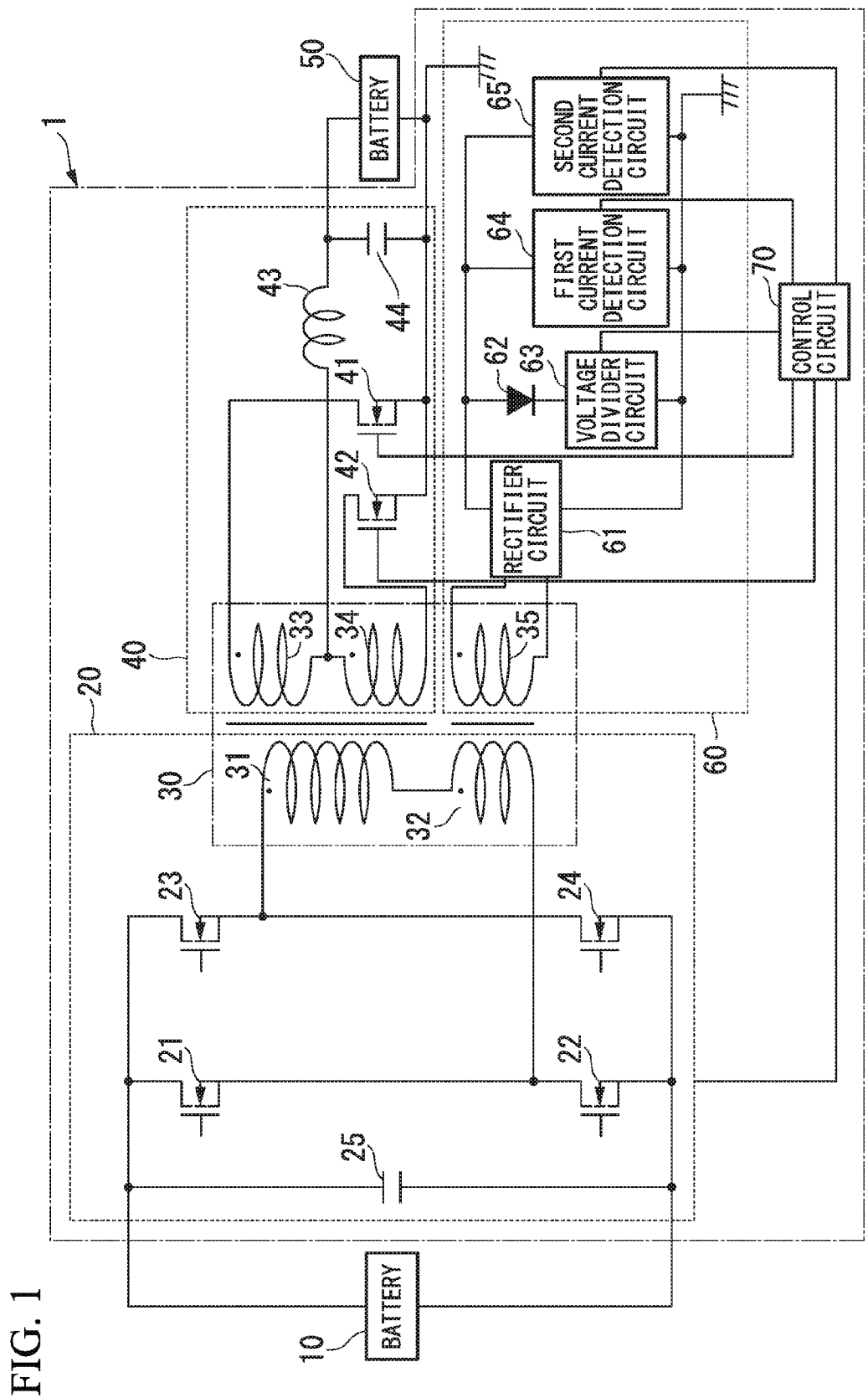
FIG. 1 is a diagram illustrating an example of a configuration of a power supply device according to the present embodiment.

FIG. 1 is a diagram showing an example of a configuration of a power supply device 1 according to the present embodiment. As shown in FIG. 1, the power supply device 1 includes a primary-side circuit 20, a secondary-side circuit 40, a synchronous rectification control circuit 60, and a control circuit 70. The power supply device 1 is configured such that the primary-side circuit 20 and the secondary-side circuit 40 are insulated by a transformer 30. A battery 10 is connected to the primary-side circuit 20, and a battery 50 is connected to the secondary-side circuit 40. Here, although an example where the battery 50 is connected as a load is shown in FIG. 1, the load may be another external power source, or the like. Additionally, the battery 50, or a load such as an external power source, may be connected to the power supply device 1 by, for example, a cable.

The primary-side circuit 20 includes a first primary winding 31, a second primary winding 32, switching elements 21 to 24, and a capacitor 25.

The switching elements 21 to 24 are, for example, N-channel MOS FETs (field effect transistors), respectively. Regarding the switching elements 21 to 24, widths of pulse signals supplied to the respective switching elements are controlled in accordance with control by an unillustrated PWM (pulse width) control circuit. The switching elements 21 to 24 configure a full bridge circuit.

Additionally, when a positive voltage is output, the switching elements 21 and 24 are controlled to enter an on-state by the PWM control circuit, and the switching elements 22 and 23 are controlled to enter an off-state. On the other hand, when a negative voltage is output, the switching elements 22 and 23 are controlled to enter the on-state, and the switching elements 21 and 24 are controlled to enter the off-state. Here, the PWM control circuit controls the widths of the pulse signals, thus controlling voltage values supplied to the first primary winding 31 and the second primary winding 32. The PWM control circuit detects, for example, a voltage between a ground and an output terminal of the power supply device 1, and controls the widths of the pulse signals for the switching elements 21 to 24 so that the detected voltage becomes a predetermined voltage.

The switching elements 21 and 22 are connected in series. A drain of the switching element 21 is connected to a drain of the switching element 23, one end of the capacitor 25, and a positive electrode of the battery 10. A source of the switching element 21 is connected to a drain of the switching element 22 and the other end of the second primary winding 32. A gate of the switching element 21 is connected to the PWM control circuit.

A source of the switching element 22 is connected to a source of the switching element 24, the other end of the capacitor 25, and a negative electrode of the battery 10. A gate of the switching element 22 is connected to the PWM control circuit.

The switching elements 23 and 24 are connected in series. A source of the switching element 23 is connected to a drain of the switching element 24 and one end of the first primary winding 31. A gate of the switching element 23 is connected to the PWM control circuit.

A gate of the switching element 24 is connected to the PWM control circuit.

In the transformer 30, the first primary winding 31 is magnetically coupled to first secondary windings 33 and 34. Additionally, the second primary winding 32 is magnetically coupled to a second secondary winding 35, thus forming a current transformer. Here, the winding number N2 of the second primary winding 32 is less than the winding number N1 of the first primary winding 31. Additionally, the winding number N4 of the second secondary winding 35 is less than the total winding number N3 obtained by totaling the wiring number of the first secondary winding 33 and the wiring number of the first secondary winding 34.

A drain of a switching element 41 is connected to one end of the first secondary winding 33. A drain of a switching element 42 is connected to one end of the first secondary winding 34. Additionally, the other end of a coil 43, whose one end is connected to the battery 50, is connected to a connection point between the other end of the first secondary winding 33 and the other end of the first secondary winding 34.

Input terminals of a rectifier circuit 61 are connected to the one end and the other end of the second secondary winding 35.

The secondary-side circuit 40 includes the first secondary windings 33 and 34, the switching elements 41 and 42, the coil 43, and a capacitor 44.

Here, the first primary winding 31 and the second primary winding 32 of the primary-side circuit 20, and the first secondary winding 33 and the first secondary windings 34 and 35 of the secondary-side circuit 40, configure the transformer 30.

The switching elements 41 and 42 are, for example, N-channel MOS FETs (field effect transistors). In accordance with control by the control circuit, the switching elements 41 and 42 perform synchronous rectification on the power to be generated in the first secondary windings 33 and 34.

Respective sources of the switching element 41 and 42 are grounded, and respective gates thereof are connected to the control circuit 70.

A synchronous rectifier control circuit 60 includes the second secondary winding 35, the rectifier circuit 61, a rectifier 62, a voltage divider circuit 63, a first current detection circuit 64, and a second current detection circuit 65.

The input terminals of the rectifier circuit 61 are connected to both ends of the second secondary winding 35.

One end of an output terminal of the rectifier circuit 61 is connected to an input terminal of the rectifier 62 (e.g., an anode), an input terminal of the first current detection circuit 64, and an input terminal of the second current detection circuit 65. The other end of the output terminal of the rectifier circuit 61 is grounded.

An output terminal of the rectifier 62 (e.g., a cathode) is connected to an input terminal of the voltage divider circuit 63. The rectifier 62 is, for example, a diode. The rectifier 62 is a diode for compensating forward voltages Vf of a rectifier 641 (FIG. 2) of the later-described first current detection circuit 64 and a rectifier 651 (FIG. 3) of the second current detection circuit 65.

An output terminal of the voltage divider circuit 63 is connected to an input terminal of the control circuit 70. Here, a reference voltage terminal of the voltage divider circuit 63 is grounded. The voltage divider circuit 63 is, for example, a full-wave rectifier circuit.

An output terminal of the first current detection circuit 64 is connected to the input terminal of the control circuit 70. Here, a reference voltage terminal of the first current detection circuit 64 is grounded.

An output terminal of the second current detection circuit 65 is connected to an input terminal of the control circuit 70. Here, a reference voltage terminal of the second current detection circuit 65 is grounded.

The control circuit 70 determines based on a result of detection by the second current detection circuit 65 whether backflow is occurring in the primary-side circuit 20. If it is determined that backflow is occurring in the primary-side circuit 20, the control circuit 70 supplies control signals to the gates of the switching elements 41 and 42, thus performing a control so as to terminate the operation of the synchronous rectification.

Next, configurations of the first current detection circuit 64, the second current detection circuit 65, and the control circuit 70 will be described with reference to FIGS. 2 and 3.

Figure 2:
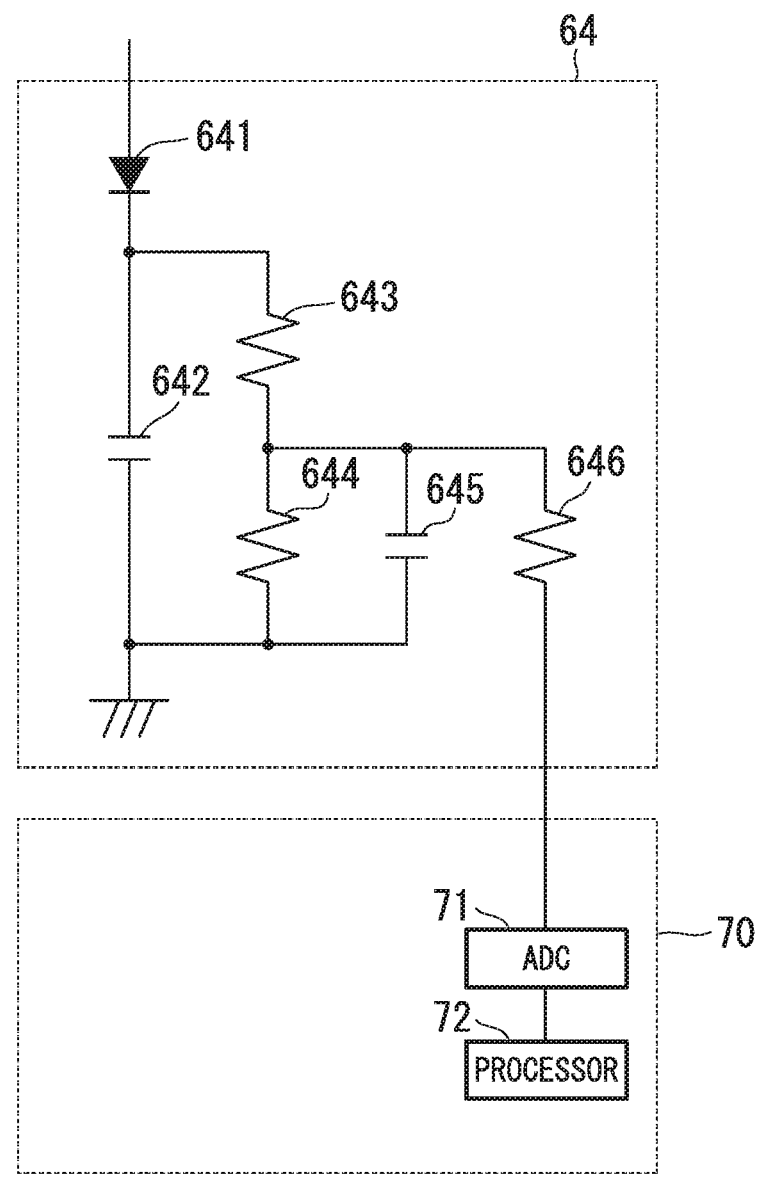
FIG. 2 is a circuit diagram showing an example of a configuration of a first current detection circuit and an example of a configuration of a part of a control circuit according to the present embodiment.

FIG. 2 is a circuit diagram showing an example of a configuration of the first current detection circuit 64 and an example of a configuration of a part of the control circuit 70 according to the present embodiment. FIG. 3 is a circuit diagram showing an example of a configuration of the second current detection circuit 65 and a part of the control circuit 70 according to the present embodiment.

First, the configuration of the control circuit 70 will be described.

As shown in FIG. 2, the control circuit 70 includes an ADC (analog signal-digital signal converter circuit) 71, and a processor 72. As shown in FIG. 3, the control circuit 70 includes a processor 72, a comparator 73, and a reference voltage source 74. Here, the ADC 71 may be included in the first current detection circuit 64. Additionally, the comparator 73 and the reference voltage source 74 may be included in the second current detection circuit 65.

The output terminal of the first current detection circuit 64 is connected to an input terminal of the ADC 71. The ADC 71 converts a current value output from the first current detection circuit 64 into a digital value, and outputs to the processor 72 of the control circuit 70, information indicating the converted value, as a result of the detection.

The output terminal of the second current detection circuit 65 is connected to one input terminal of the comparator 73, and the reference voltage source 74 is connected to the other input terminal thereof. In other words, the comparator 73 compares an output voltage value of the reference voltage source 74 and an output value of the second current detection circuit 65, and outputs to the processor 72 of the control circuit 70, a result of the comparison, as a result of the detection.

The output voltage value of the reference voltage source 74, as described later, is preset according to a voltage value determined by, for example, experiments, so as to make it possible to detect a minimum value of current values to be detected by the second current detection circuit 65.

The processor 72 detects backflow which occurs in the primary-side circuit 20 using the result of the detection by the comparator 73 in this manner, and controls the gates of the switching elements 41 and 42 in response to the result of the detection. Additionally, the control circuit 70 controls the switching elements 21 to 24 of the primary-side circuit 20, based on the result of the detection by the ADC 71 and the output of the voltage divider circuit 63, thus controlling, for example, the output voltage and the output current of the power supply device 1.

Next, the first current detection circuit 64 will be described.

As shown in FIG. 2, the first current detection circuit 64 includes a rectifier 641, a capacitor 642, a resistor 643, a resistor 644, a capacitor 645, and a resistor 646.

An input terminal of the rectifier 641 (e.g., an anode) is the input terminal of the first current detection circuit 64. An output terminal of the rectifier 641 (e.g., a cathode) is connected to one end of the resistor 643 and one end of the capacitor 642. The rectifier 641 is, for example, a diode. The rectifier 641 is operative to detect a peak of current.

The other end of the resistor 643 is connected to one end of the resistor 644, one end of the capacitor 645, and one end of the resistor 646.

The other end of the capacitor 642, the other end of the resistor 644, and the other end of the capacitor 645 are grounded. The capacitor 642, the capacitor 645, the resistor 643, the resistor 644, and the resistor 646 configure a circuit that detects a current at a first response speed.

The other end of the resistor 646 is connected to the ADC 71 of the control circuit 70.

Next, the second current detection circuit 65 will be described.

Figure 3:
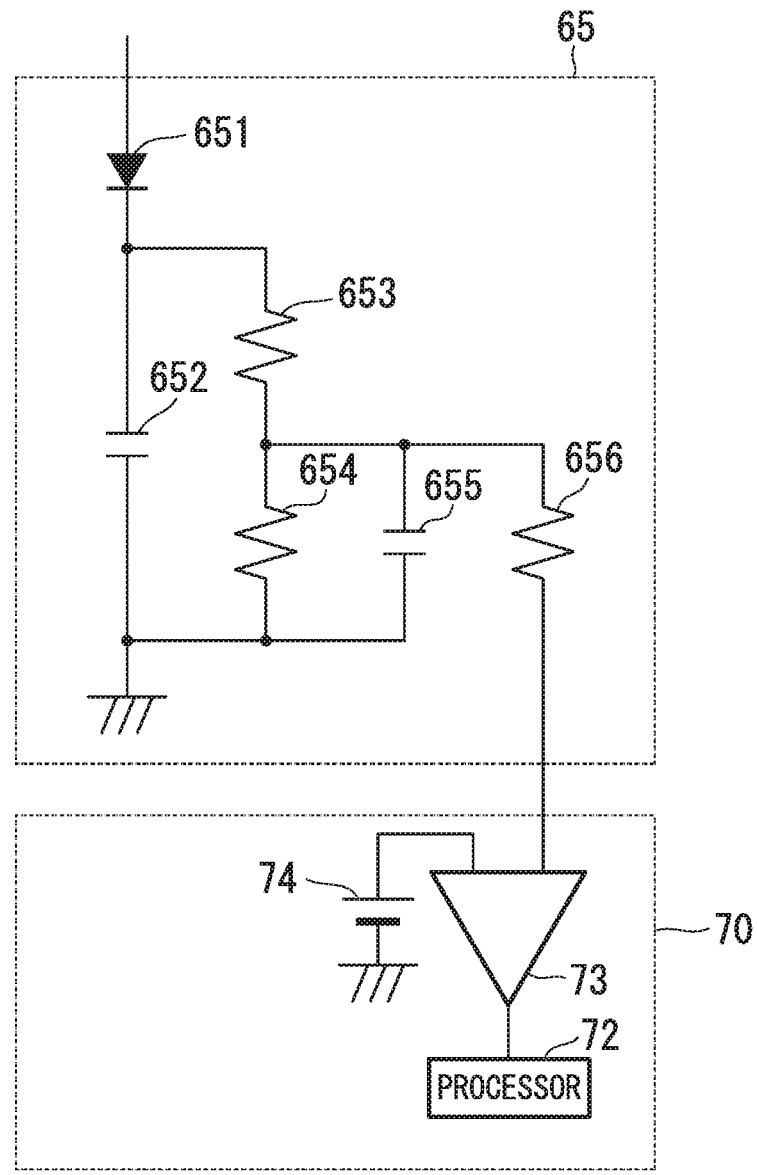
FIG. 3 is a circuit diagram showing an example of a configuration of a second current detection circuit and a part of the control circuit according to the present embodiment.

As shown in FIG. 3, the second current detection circuit 65 includes a rectifier 651, a capacitor 652, a resistor 653, a resistor 654, a capacitor 655, and a resistor 656.

As shown in FIG. 3, the configuration of the second current detection circuit 65 is the same as that of the first current detection circuit 64 shown in FIG. 2. The rectifier 651 corresponds to the rectifier 641, the capacitor 652 corresponds to the capacitor 642, the resistor 653 corresponds to the resistor 643, the resistor 654 corresponds to the resistor 644, the capacitor 655 corresponds to the capacitor 645, the resistor 656 corresponds to the resistor 646. Additionally, the other end of the resistor 656 is connected to the one input terminal of the comparator 73 of the control circuit 70.

The second current detection circuit 65 differs from the first current detection circuit 64 in that the capacitor 652, the capacitor 655, the resistor 653, the resistor 654, and the resistor 656 configure a circuit that detects a current at a second response speed. Here, the second response speed is faster than the first response time.

Since the first response speed is set slower than the second response speed, a value close to an average value of current values is detected by the first current detection circuit 64. On the other hand, the second response speed is set faster than the first response time. For this reason, the second current detection circuit 65 outputs to the comparator 73, a current signal substantially the same as an current signal to be input. The comparator 73 constantly compares the current signal input from the second current detection circuit 65 and the reference voltage source 74, and outputs a result of the comparison to the processor 72. This makes it possible to always detect a value of the current flowing through the synchronous rectifier control circuit 60. Consequently, the second current detection circuit 65, the comparator 73, and the processor 72, can detect a change in current input to the second current detection circuit 65, which occurs when backflow occurs, or which occurs by a change in current supplied to the load.

As described above, the first current detection circuit 64 performs detection of overcurrent. On the other hand, the second current detection circuit 65 performs detection of backflow.

Figure 4:
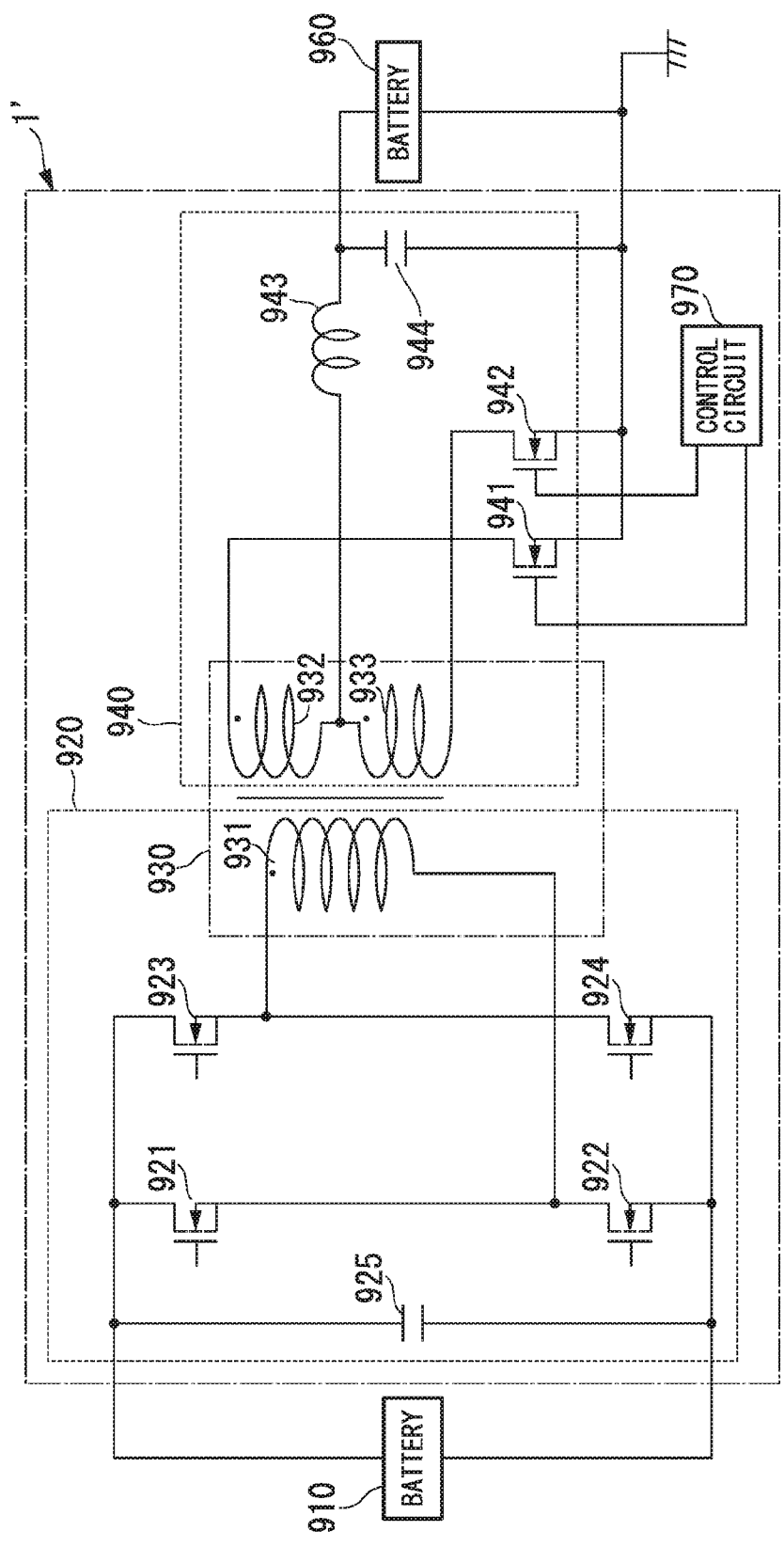
FIG. 4 is a diagram showing an example of a configuration of a power supply device including no synchronous rectifier control circuit according to a comparative example.
Figure 5:
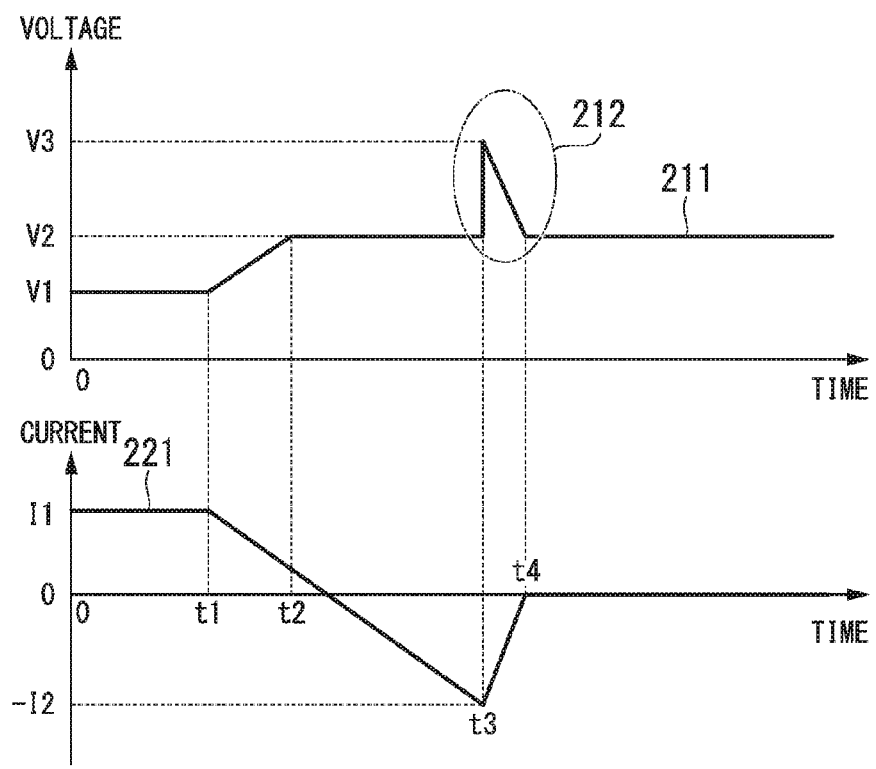
FIG. 5 is a diagram showing an example of a waveform when backflow occurs in the power supply device according to the present embodiment.

Next, a principle that the voltage value of the battery 50 becomes higher than the output voltage value of the secondary-side circuit 40, backflow occurs in the power supply device 1, and thereafter a surge voltage is generated, will be described with reference to FIGS. 4 and 5. FIG. 4 is a diagram showing an example of a configuration of a power supply device 1' including no synchronous rectification control circuit 60 according to a comparative example. FIG. 5 is a diagram showing an example of a waveform when backflow is occurring in the power supply device 1' according to the present embodiment.

As shown in FIG. 4, the power supply device 1' includes a primary-side circuit 920, a secondary-side circuit 940, and a control circuit 970. A battery 910 is connected to a primary side of the power supply device 1', and a battery 960 is connected to a secondary-side thereof. The configuration of the power supply device 1' is the configuration of the power supply device 1 shown in FIG. 1 including no synchronous rectification control circuit 60. The primary-side circuit 920 corresponds to the primary-side circuit 20 of the power supply device 1, a transformer 930 corresponds to the transformer 30 of the power supply device 1, the secondary-side circuit 940 corresponds to the secondary-side circuit 40 of the power supply device 1, and the control circuit 970 corresponds to the control circuit 70 of the power supply device 1.

The primary-side circuit 920 includes a primary winding 931, switching elements 921 to 924, and a capacitor 925. The switching elements 921 to 924 correspond to the switching elements 21 to 24 of the power supply device 1, and the capacitor 925 corresponds to the capacitor 25 of the power supply device 1.

The secondary-side circuit 940 includes a secondary winding 932, a secondary winding 933, switching elements 941 and 942, a coil 943, and a capacitor 944. The switching elements 941 and 942 correspond to the switching elements 41 and 42 of the power supply device 1, the coil 943 corresponds to the coil 43 of the power supply device 1, and the capacitor 944 corresponds to the capacitor 44 of the power supply device 1.

Here, the primary winding 931 of the primary-side circuit 920 and the secondary windings 932 and 933 of the secondary-side circuit 940 configure the transformer 930. The primary winding 931 corresponds to the first primary winding 31 of the power supply device 1, the secondary winding 932 corresponds to the first secondary winding 33 of the power supply device 1, and the secondary winding 933 corresponds to the first secondary winding 34 of the power supply device 1.

Respective components of the above-mentioned primary-side circuit 920, the transformer 930, the secondary-side circuit 940, and the control circuit 970, and connection relationships among these circuits, are the same as those of the power supply system 1 shown in FIG. 1.

In FIG. 5, a horizontal axis represents time, and a vertical axis of an upper waveform represents an output voltage value, and a vertical axis of a lower waveform represents an output current value. A waveform 211 represents a waveform showing a change in output voltage value over time, and a waveform in a region surrounded by a reference numeral 212 represents a waveform caused by a surge voltage. Additionally, a waveform 221 represents a waveform showing a change in output voltage value over time. Here, the output voltage in FIG. 4 is equal to a voltage between both ends of the capacitor 944 shown in FIG. 4.

In FIG. 4, in a period from time 0 to time t1, a voltage value of the battery 960 and an output voltage value of the secondary-side circuit 940 are equal to a voltage value V1. In this period, an output current is I1.

In a period from time t1 to time t2, the voltage of the battery 960 increases from V1 to V2, as indicated by the waveform 211. Here, the voltage value V2 is greater than the voltage value V1.

In a case where the voltage of the battery 960 increases from V1 to V2, the switching elements 941 and 942 are short-circuited, a current in accordance with the increase in voltage flows from the battery 960 through the coil 943 to the secondary windings 932 and 933 of the transformer 930. A current flows from a connection point between the secondary winding 932 and the secondary winding 933 to the drain of the switching element 942. Consequently, after the time t1, the current value decreases from I1, and backflow occurs, as indicated by the waveform 221 shown in FIG. 5.

The current flows in the secondary winding 933, thus causing a current to be generated in the primary winding 931 magnetically coupled to the secondary winding 933. A current is generated in the one end, connected to the source, of the switching element 923 through the primary winding 931, from the other end, connected to the drain, of the switching element 922.

Then, by the current being generated in the primary windings 931, the current flows from the source of the switching element 923 to the drain thereof, and further flows from the drain of the switching element 923 to the positive electrode of the battery 910.

In FIG. 5, for example, when the output current value readies −I2, synchronous rectification operation is terminated at the timing of time t3. Here, the current value −I2 is smaller than 0 [A (ampere)].

Consequently, in the period from time t3 to time t4, the current value changes from −I2 to 0, as indicated by the waveform 221. Thereby, in the power supply device 1', in the period from time t3 to time t4, the synchronous rectification is terminated so that the switching elements 941 and 942 are turned off. Then, the energy that has been charged in the coil 943 causes a surge voltage to be generated between the source and the drain of the switching element 941 and 942 (reference numeral 212). The maximum value of the generated surge voltage is, for example, V3, as indicated by reference numeral 212 shown in FIG. 4. This voltage value V3 is greater than the voltage value V2.

In some cases, the surge voltage generated in this manner affects the load and the switching elements 941 and 942, which are connected to the power supply device 1'. If the surge voltage exceeds the breakdown voltages of the switching elements 941 and 942, the switching elements 941 and 942 are broken by this backflow or surge voltage in some cases.

Next, operation when the load voltage changes in the power supply device 1 will be described with reference to FIGS. 1 and 6.

Figure 6:
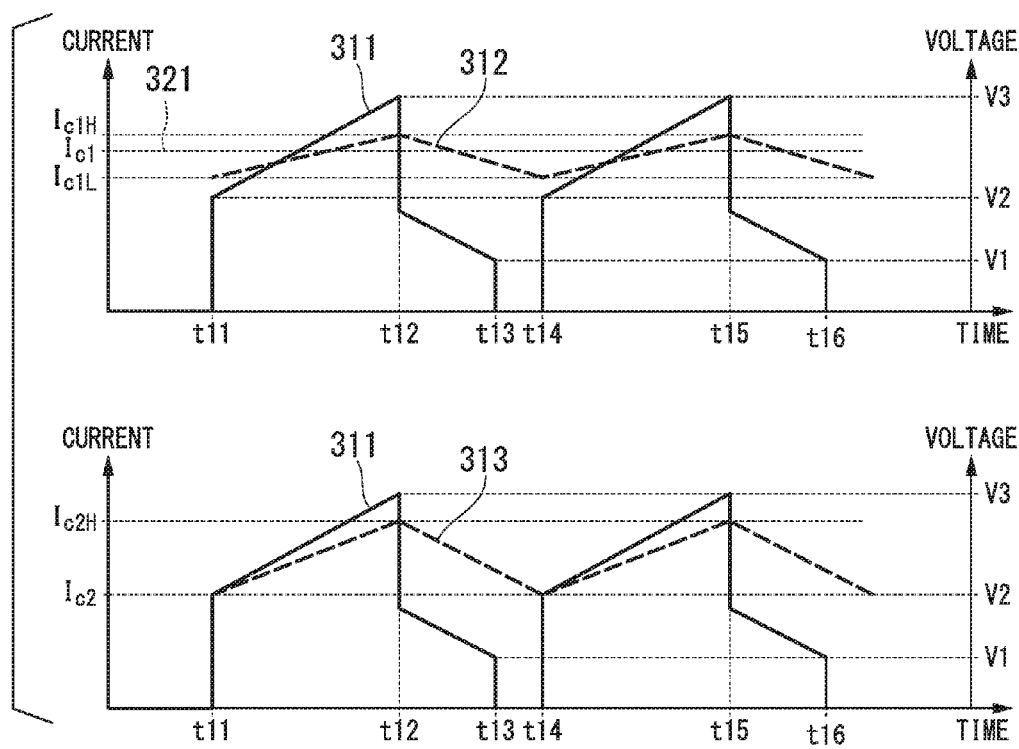
FIG. 6 is a diagram showing an example of an output voltage and a result of detection performed by the synchronous rectifier control circuit when a load voltage changes in the power supply device according to the present embodiment.

FIG. 6 is a diagram showing an example of the output voltage and a result of the detection performed by the synchronous rectification control circuit 60 when the load voltage changes in the power supply device 1 according to the present embodiment. In FIG. 6, a horizontal axis represents time, a left vertical axis represents current, and a right vertical axis represents a voltage.

In upper and lower stages of FIG. 6, a waveform 311 represents a waveform obtained by simulating a case where the load voltage changes.

In the upper of FIG. 6, a waveform 312 represents a waveform of current detected by the first current detection circuit 64, and a chain line 321 represents an average value $I_{c1}$ of the waveform of the current detected by the first current detection circuit 64.

In the lower stage of FIG. 6, a waveform 313 represents a waveform of current detected by the second current detection circuit 65.

First, the waveform of the current detected by the first current detection circuit 64 will be described.

As shown in the upper stage of FIG. 6, the load voltage increases from V2 to V3 in a period from time t11 to t12. Along with this, a value of the current detected by the first current detection circuit 64 increases from $I_{c1L}$ to $L_{c1H}$. Here, V3 is a voltage value greater than V2, and $I_{c1H}$ is a current value greater than $I_{c1L}$.

In a period from time t12 to time t13, the load voltage decreases from V3 to V1. Additionally, in a period from time t12 to time t14, the value of the current detected by the first current detection circuit 64 decreases from $I_{c1H}$ to $I_{c1L}$. Here, V1 is a voltage value smaller than V2.

Then, in the period from the time t11 to time t14, the ADC 71 of the control circuit 70 detects a current value $I_{c1}$, which is an average value of $I_{c1H}$ and $I_{c1L}$ detected by the first current detection circuit 64.

Here, a period from the time t14 to t16 is a repetition of the period from time t11 to time t13.

Next, the waveform of the current detected by the second current detection circuit 65 will be described.

As shown in the lower stage of FIG. 6, as the load voltage increases from V2 to V3 in the period from time t11 to time t12, the value of the current detected by the second current detection circuit 65 increases from $I_{c2}$ to $I_{c2H}$. Here, $I_{c2H}$ is a current value greater than $I_{c2}$.

In the period from t12 to time t13, the load voltage decreases from V3 to V1. Additionally, in the period from time t12 to time t14, the value of the current detected by the second current detection circuit 65 decreases from $I_{c2H}$ to $I_{c2}$.

Then, in the period from the time t11 to time t14, the control circuit 70 detects a change in the current detected by the second current detection circuit 65. At the timing of time t14, the comparator 73 of the control circuit 70 detects $I_{c2}$, which is the minimum value of the current detected by the second current detection circuit 65.

Additionally, operation from time t14 to t16 is similar to the operation from time t11 to time t13 in the upper stage of FIG. 6.

Next, operation of the power supply device 1 when the load voltage changes as shown in FIG. 6 will be described.

The control circuit 70 detects a change in the current detected by the second current detection circuit 65, and detects that backflow occurs at the timing of time t13, at which the current value is the minimum value. Then, when it is detected that backflow has occurred, the control circuit 70 performs control so as to terminate the synchronous rectification by the switching elements 41 and 42.

As described above, the power supply device 1 includes: a switching element (41 or 42) configured to perform synchronous rectification on a power to be induced in a first secondary wiring (33, 34) of a transformer 30 configured to perform voltage conversion; a first current detection circuit 64 configured to detect a value of a current to be induced in a second secondary wiring 35 of the transformer 30; a second current detection circuit 65 configured to detect a change in the current to be induced in the second secondary wiring 35, the second current detection circuit 65 having a higher response speed with respect to conversion of the current than that of the first current detection circuit 64; and a control unit (control circuit 70) configured to determine based on the change in the current detected by the second current detection circuit 65 whether or not backflow is occurring, and control the switching element (41 or 42) in accordance with a result of the determination.

According to the power supply system 1 of the present embodiment, this configuration makes it possible to instantly terminate the synchronous rectification operation at the timing (time t14) at which the load voltage changes and backflow begins to occur, thus making a backflow occurring period a very short time. This can reduce the backflow occurring in the switching devices 41 and 42, and thus reduce the impact thereon. Therefore, according to the power supply device 1 of the present embodiment, it is possible to prevent the breakdown and the like of the semiconductor elements such as the switching elements 41 and 42, which are caused by backflow.

Additionally, in the conventional power supply devices, even if backflow occurs, synchronous rectification operation is terminated at the timing such as time t3 shown in FIG. 5. For this reason, backflow and a surge voltage occur in the conventional power supply devices. Therefore, the synchronous rectification operation could have been used only in a region where the breakdown voltage of components such as switching elements is high, for example, a region at high current that is, for example, 50A (amperes) or more.

On the other hand, according to the power supply device 1 of the present embodiment, it is possible to terminate synchronous rectification at the timing at which backflow begins to occur, thus making it possible to lower the breakdown voltage of components than in the conventional power supply devices. For this reason, even in a region at low current (e.g., 10A), it becomes possible to perform synchronous rectification operation. As a result, according to the power supply device 1 of the present embodiment, it is possible to perform synchronous rectification operation in a wide load range, not limited to the time of high load, thus making it possible to significantly enhance the efficiency at the time of light load of a product mounted with the power supply device of the present invention. For example, if it is mounted on a vehicle, it is possible to enhance the fuel economy of the vehicle.

The description has been given in the above embodiment with respect to the case where the circuits of the primary-side circuit 20 a configured by a full bridge circuit. However, the configuration is not limited to the full bridge circuit as long as the rectifier circuit of the secondary-side circuit 40 is configured by a synchronous rectification circuit. For example, a circuit type of the primary-side circuit 20 may be a circuit type of non-resonant PWM control, or a switching power supply device configured by a phase-shift switching circuit.

Here, in the above-described power supply device 1, each processor in the control circuit 70 may be one that is implemented by dedicated hardware, or one whose functions are implemented by recording on a computer-readable according medium, a program for implementing the functions of each processor, and causing a computer system to read and execute the program recorded on this recording medium.

In other words, part or all of the processing functions of the control circuit 70 may be implemented by mounting in the above-described control circuit 70, a micro controller including a CPU, a ROM, a RAM, and the like, or a computer system such as a microcomputer, and causing the CPU to read and execute a software program.

DESCRIPTION OF REFERENCE SYMBOLS

1 . . . power supply device
10, 50 . . . battery
20 . . . primary-side circuit
21 to 24, 41, 42 . . . switching element
25, 44, 642, 645, 652, 656 . . . capacitor
30 . . . transformer
40 . . . secondary-side circuit
43 . . . coil
60 . . . synchronous rectification control circuit
62, 641, 651 . . . rectifier
63 . . . voltage divider circuit
64 . . . first current detection circuit
65 . . . second current detection circuit
70 . . . control circuit
71 . . . ADC
72 . . . processor
73 . . . comparator
74 . . . reference voltage source
643, 644, 646, 653, 654, 656 . . . resistor

The invention claimed is:

1. A power supply device comprising:
a switching element configured to perform synchronous rectification on a power to be induced in a first secondary wiring of a transformer configured to perform voltage conversion;
a first current detection circuit configured to detect a value of a current to be induced in a second secondary wiring of the transformer;
a second current detection circuit configured to detect a change in the current to be induced in the second secondary wiring, the second current detection circuit having a higher response speed with respect to conversion of the current than that of the first current detection circuit; and
a control unit configured to
determine based on the change in the current detected by the second current detection circuit whether or not backflow is occurring, and
control the switching element in accordance with a result of the determination, wherein
the second current detection circuit is configured to detect a minimum value of values of the current, and
the control unit is configured to, in a first case that the minimum value is detected by the second current detection circuit, determine that backflow is occurring.

2. The power supply device according to claim 1, wherein the control unit is configured to
control the switching element to enter an off-state in a second case that it is determined that backflow is occurring in a primary winding side of the transformer, and
control the switching element to perform synchronization rectification in a third case that it is determined that backflow is not occurring in the primary winding side of the transformer.

3. The power supply device according to claim 1, wherein
the transformer on a primary wiring side includes a first primary winding and a second primary winding,
the first primary winding and the second primary winding are connected in series,
the first primary winding and the first secondary wiring are magnetically coupled,
the second primary winding and the second secondary winding are magnetically coupled,
the second secondary winding is electrically unconnected to the first secondary wiring,
the switching element is connected to the first secondary winding,
a rectifier configured to rectify the current to be induced in the second secondary winding is connected to the second secondary winding, and
the second current detection circuit is configured to detect the change of the current rectified by the rectifier, thereby detecting conversion of the current flowing through the second primary winding magnetically coupled to the second secondary winding.

4. The power supply device according to claim 3, wherein
a winding number of the first primary winding is N1,
a winding number of the second primary winding is N2 that is less than N1,
a winding number of the first secondary winding is N3, and
a winding number of the second secondary winding is N4 that is less than N3.

* * * * *